Figure 1:
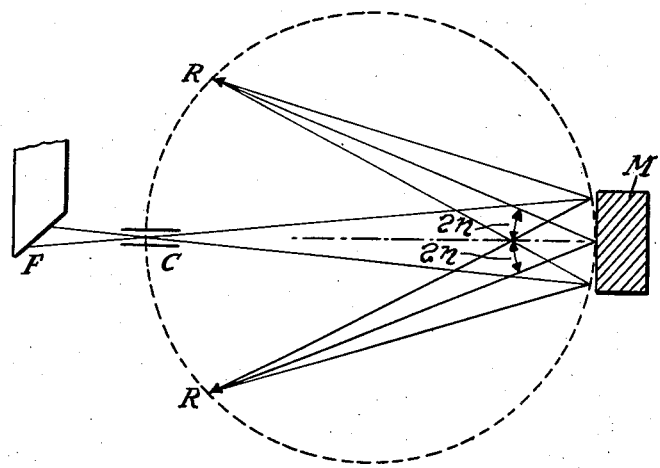

Aug. 4, 1959 F. KHOL 2,898,470
APPARATUS FOR MEASURING THE INTERNAL STRESSES IN MATERIALS
Filed May 9, 1958

INVENTOR.
František Khol
BY

United States Patent Office 2,898,470
Patented Aug. 4, 1959

2,898,470

APPARATUS FOR MEASURING THE INTERNAL STRESSES IN MATERIALS

František Khol, Lysá upon Labe, Czechoslovakia

Application May 9, 1958, Serial No. 734,372

Claims priority, application Czechoslovakia May 11, 1957

1 Claim. (Cl. 250—53)

The present invention relates to an apparatus for directly measuring the internal stresses in materials by X-ray diffraction without destroying the object under investigation.

The hitherto known methods and devices for determining at least approximately the internal elastic stresses in materials of mechanical or structural parts as basic values for use in the designing of such parts, are based on the theory of elasticity according to which the deformation of the material is proportional to the stress. Mechanical methods permit the necessary stress analysis to be carried out only at the expense of the destruction or permanent deformation of the part under investigation, while the tensometrical methods can determine only the additional stresses caused by external forces but are unable to determine the original residual stresses resulting from the manufacturing process and which remain permanently in the part, even if the latter is not subjected to external forces.

Better results are obtained with measuring methods which employ X-ray diffraction in atomic lattices, whereby it is possible to determine the total internal stress corresponding to the deformation of these lattices as the interatomic spacing changes under compression and tension. These methods are precise, but their use in measuring the deformation of the atomic lattices is time-consuming and requires expensive equipment as well as experienced and highly qualified specialists.

The chief object of the present invention is to provide a simple and cheap apparatus enabling any well trained operator with a minimum of specialized qualification to determine readily the internal stresses in materials without carrying out intricate operations and calculations.

The basic relationship for the determination of the tangential component of the internal stress $\iota$ is expressed by the following well known equation:

$$(1) \quad \iota = \frac{E}{1+\nu} \cdot \frac{1}{\sin^2 \psi_1 - \sin^2 \psi_2} \cdot \frac{d\psi_1 - d\psi_2}{d_0}$$

wherein

E indicates Young's modulus of elasticity
$\nu$ Poisson's constant of transverse contraction
$\psi_1$ and $\psi_2$ the angles between the normals to the diffraction system of the atomic planes and the normal to the surface of the sample under examination, and
$d_0$ is the interatomic distance (interplanar spacing) in the unstressed material The above Equation 1 can be found in any of the following publications: G. L. Clark, University of Illinois, Applied X-rays, 4th edition, 1955; A. Taylor, X-ray Metallography, 1945, p. 246; H. S. Peiser et al., X-ray Diffraction, 1955, p. 605.

If the modulus of elasticity and the constant of transverse contraction of the material undergoing testing are known, it is only necessary for the purpose of determining the internal stress in this material to find out the angles $\psi_1$ and $\psi_2$ and the deformations of the atomic planes and interatomic distances in the directions $\psi_1$ and $\psi_2$. These values are determined from the position of the diffractions occurring on the respective atomic planes which are recorded either on a film on which their distances are measured, or intercepted by means of any of the well known detectors of X radiations, such as for example, a Geiger-Müller counter or ionization chamber and the like. All X-ray diffraction methods are therefore based on a precise determination of the interatomic distances, and employ the method of back reflection for determining the diffraction angle $2\eta$ (Fig. 1) whose dependence on the interplanar distance $d$ is expressed by the following equation derived from Bragg's law of X-ray diffraction:

$$(2) \quad \cos \eta = \frac{\lambda}{2d}$$

wherein $\lambda$ is the wavelength of the radiation.

The main feature of the present invention consists in that the focus of the X-ray tube on the apparatus is arranged as a slit forming the source of the divergent primary radiation, thus ensuring intense diffraction on the atomic planes. These diffractions are intercepted by a detecting element, such as a Geiger-Müller counter lying always on the focus circle which is tangent to the irradiated surface of the test specimen. The position of the detector on the focus circle at which the detector indicates a maximum intensity of the diffracted beam determines exactly the diffraction angle $2\eta$.

Figure 2:
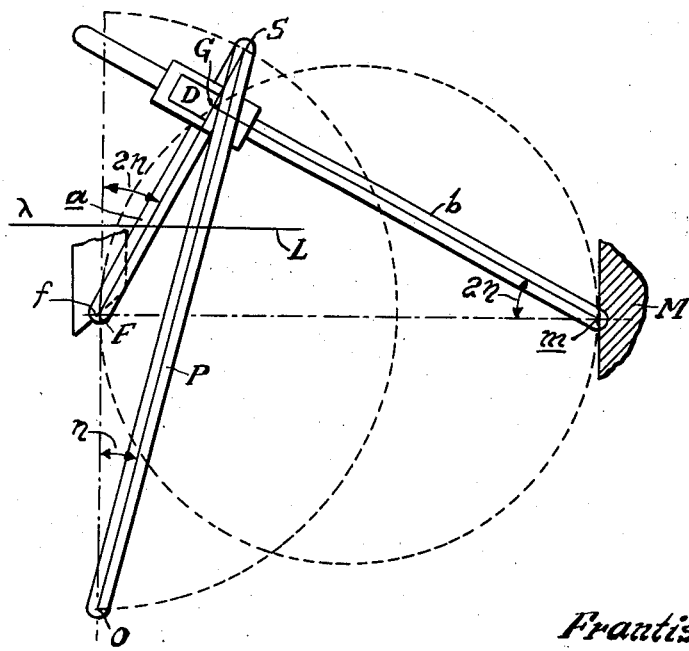

The above and other objects, features and advantages of the invention, will be apparent in the following detailed description of an illustrative embodiment of the invention which is to be read in connection with the accompanying drawing, wherein:

Fig. 1 is a diagram illustrating the principles of existing diffraction methods; and Fig. 2 is a schematic plan view of an apparatus embodying the present invention.

Referring to Fig. 2 in detail, it will be seen that the housing of the detector D is fixed on the arm $a$ with the axis of the detector being perpendicular to the axis of the arm $a$ which is swingable about a pivot $f$ mounted on the X-ray tube housing and whose geometrical axis passes through the focus F of the X-ray tube. The housing of detector D is slidable along an arm $b$ which has its axis parallel to the axis of the detector, that is, at right angles to the axis of arm $a$. One end of the arm $b$ is mounted on a pivot $m$ which has its axis tangent to the irradiated surface of the test piece M. Thus, the pivot $m$ is provided on a holder for the test piece M so as to maintain the desired fixed position relative to the latter.

During measuring, either the X-ray tube is moved towards the test piece M if the latter is of large size or, if the test piece is of small size, the latter is moved toward the X-ray tube. Such relative movements of the test piece M and the X-ray tube toward and away from each other are parallel to the axis of the incident radiation and are for the purpose of bringing the detector D to the position where it indicates the maximum intensity of the diffraction beam correspondnig to the diffraction angle $2\eta$. During such movement, the arm $b$ travels in the guideway of the detector housing and pivots about $m$, while the arm $a$ bearing the detector turns about the pivot $f$ and the axis of the detector D is always aimed at the center of the irradiated surface of test piece M to which the pivot $m$ is tangent. The longitudinal axes of the arms $a$ and $b$ form the two small sides of a right-angled triangle, one of these sides having a constant length along the arm $a$ and the other side having a variable length along the arm $b$, hypotenuse of the triangle is equal to the distance between the axes of pivots $f$ and $m$. Further, the slit of the detector D coincides with the apex G of the triangle at the right angle between the arms $a$ and $b$. The diffraction angle $2\pi$ is equal to the angular deflection of the arm $a$ from the plane passing through the focus F perpendicular to the direction of the plane passing through pivots $f$ and $m$, when the detector D indicates the maximum intensity of the diffraction beam. The single angle $\eta$ is equal to the angular deflection of a ruler arranged pivotally about an axis O which lies in a plane passing through the focus F perpendicularly to the axis of primary radiation. The ruler P is connected with an extension of arm $a$ carrying a pivot S which is slidable in a slit provided in the ruler P, the axis of the pivot S being at the same distance from the axis F as is the axis O.

Since the ruler P and the extension of arm $a$ both intersect a circle at a single point defined by the axis of pivot S, it is apparent that the central angle subtended plane OF and arm $a$ is twice the circumferential angle subtended by plane OF and ruler P.

The ruler P moves across a measuring plate bearing a line L parallel to the axis of the radiation. The distance between the line L and the vertex of the angle $\eta$ located at the center of the pivot O equals a predetermined or selected multiple of the half wave length $\lambda$ of the radiation. The same multiple of the interplanar distance $d$ can be read on the scale of the ruler P as the distance between the intersection point of the measuring line of said ruler with the line L and the vertex of the angle $\eta$ according to the Equation 2.

In order to determine the internal stress $\iota$ at a selected point of the test piece M, it is necessary to irradiate the investigated point successively in two directions. The interatomic spacings $d\Psi_1$ and $d\Psi_2$ in the stressed condition can be read on the ruler P and their values substituted into Equation 1.

Since the values E, $\nu$, $\psi_1$, $\psi_2$ and $d_0$ are constant for a given material of the test piece equation (1) can be simplified to the following:

$$\iota = C[d\psi_1 - d\psi_2] \quad (3)$$

$$C = \frac{E}{d_0[1+\nu][\sin^2 \psi_1 - \sin^2 \psi_2]}$$

wherein in establishing the stress $\iota$ it is therefore necessary for a given material to calculate the constant C or to determine the same empirically by analyzing a sample of the same material in unstressed condition and another same with a known stress, whereby the interatomic distance $d_0$ in the unstressed material is also ascertained. If the ruler P is provided with a scale which is calibrated so that, instead of the interatomic distances, the values $Cd\psi_1$ and $Cd\psi_2$ can be directly read, then the stress $\iota$ can be computed readily as the difference of the values indicated on the ruler. It is advantageous to provide the apparatus with a set of interchangeable rulers calibrated for various materials to be studied, and which are characterized by different constants C.

In the apparatus described above it is advantageous to make use of an X-ray tube with a line-shaped focus and to utilize the entire divergent beam of primary radiation. Thus, the intensity of the diffraction is substantially increased and can be readily registered. As registering of the diffraction is carried out on the focus circles with the circumferential angles over the diameter being right angles, the diffraction lines are sharp and permit the positions of the individual diffractions to be accurately adjusted. The area of the irradiated surface of the test piece is so large that there is a possibility of measuring the average stress on an area of at least 1 sq. cm. Thus, the measurement is not limited to the stress at one point only, and the use of the apparatus for workshop and field measurements offers a more reliable picture of the internal stresses occurring in the object under consideration. The apparatus according to the present invention enables the stress to be determined at a given spot within 5 to 10 minutes as against the 2 to 3 hours required by the methods known heretofore. Further, the apparatus embodying the invention avoids the possibility of mistakes made in computing the interatomic distances from the measured diffraction angles.

If the apparatus is provided with two or more detectors fixed on pivotal arms at various distances from their turning axes, and with corresponding slidable arms converging in a single point, it is capable of measuring simultaneously two or more diffractions.

I claim:

Apparatus for measuring the internal stresses in materials by X-ray diffraction, comprising an X-ray tube, a housing enclosing said X-ray tube and having a slit disposed at the focus of said tube to emit a primary divergent radiation, a first arm, a first pivot on said housing of the X-ray tube with the axis of said first pivot extending through said focus perpendicular to the axis of said primary radiation, said first arm being pivotally mounted, at one end, on said first pivot, a detector in a housing adapted to receive a reflected beam of X-radiation, said housing of the detector being fixed on said first arm with the axis of the latter being perpendicular to the axis of the detector, a second arm, means slidably connecting said second arm to said housing of the detector with the axis of said second arm being parallel to said axis of the detector and with said housing of the detector being movable longitudinally along said second arm, a second pivot having its axis parallel to the axis of said first pivot and being movable toward and away from the latter along the axis of the primary radiation, said axis of the second pivot being maintained tangent to the irradiated surface of the material under test, said second arm being pivotally mounted, at one end, on said second pivot, a graduated ruler having a slot extending longitudinally therealong, a pin on said first arm slidable in said slot to connect said ruler to said first arm and to move along a circular path centered at said axis of the first pivot, a third pivot having its axis parallel to said axis of the first pivot and intersecting said circular path at a point on the latter which is at the end of a radius extending from said axis of the first pivot perpendicular to said axis of the primary radiation, one end of said ruler being pivotally mounted on said third pivot and a measuring plate lying in a plane parallel and adjacent to the plane of movement of said ruler about said third pivot and having a line thereon extending parallel to said axis of the primary radiation and spaced from said axis of the third pivot by a distance equal to a predetermined multiple of the half wave length of said primary radiation so that, when said second pivot is adjusted to a position where said detector indicates a maximum intensity of the diffraction beam, said predetermined multiple of the interplanar distance can be read directly on said ruler as the distance along the latter from said axis of the third pivot to the intersection of said line with said ruler.

References Cited in the file of this patent

UNITED STATES PATENTS

| | | |
|---|---|---|
| 2,462,374 | Firth | Feb. 22, 1949 |
| 2,500,948 | Kaiser et al. | Mar. 21, 1950 |
| 2,648,011 | Good | Aug. 4, 1953 |